United States Patent
Yamaguchi et al.

(10) Patent No.: US 6,922,988 B2
(45) Date of Patent: Aug. 2, 2005

(54) EXHAUST EMISSION CONTROL APPARATUS AND METHOD FOR INTERNAL COMBUSTION ENGINE

(75) Inventors: Masaaki Yamaguchi, Toyota (JP); Hisashi Ohki, Numazu (JP); Masaaki Kobayashi, Toyota (JP); Daisuke Shibata, Susono (JP)

(73) Assignee: Toyota Jidosha Kabushikia Kaisha, Toyota (JP)

( * ) Notice: Subject to any disclaimer, the term of this patent is extended or adjusted under 35 U.S.C. 154(b) by 47 days.

(21) Appl. No.: 10/735,671

(22) Filed: Dec. 16, 2003

(65) Prior Publication Data

US 2004/0123585 A1 Jul. 1, 2004

(30) Foreign Application Priority Data

Dec. 20, 2002 (JP) ........................................ 2002-369546

(51) Int. Cl.[7] ................................................ F01N 3/00
(52) U.S. Cl. .............................. 60/286; 60/274; 60/297; 60/301; 60/303
(58) Field of Search .......................... 60/274, 276, 285, 60/286, 280, 295, 297, 301, 303

(56) References Cited

U.S. PATENT DOCUMENTS

| | | | | |
|---|---|---|---|---|
| 5,974,791 A | * | 11/1999 | Hirota et al. ................. | 60/276 |
| 6,145,303 A | | 11/2000 | Strehlau et al. | |
| 6,574,955 B2 | * | 6/2003 | Schroder et al. .............. | 60/295 |
| 6,588,205 B1 | * | 7/2003 | Kumagai et al. .............. | 60/298 |
| 6,637,198 B2 | * | 10/2003 | Hertzberg ..................... | 60/295 |
| 6,854,266 B2 | * | 2/2005 | Schnaibel et al. ............. | 60/295 |

FOREIGN PATENT DOCUMENTS

| | | |
|---|---|---|
| DE | 198 27 195 A 1 | 12/1999 |
| DE | 198 51 843 A 1 | 5/2000 |
| JP | A 2000-161045 | 6/2000 |
| JP | A 2000-274232 | 10/2000 |
| JP | A 2002-38932 | 2/2002 |
| JP | A 2003-166415 | 6/2003 |
| WO | WO 01/00976 A1 | 1/2001 |

* cited by examiner

*Primary Examiner*—Binh Q. Tran
(74) *Attorney, Agent, or Firm*—Oliff & Berridge, PLC

(57) ABSTRACT

An exhaust emission control apparatus for an internal combustion engine is capable of suppressing a nasty smell due to the hydrogen sulfide generated upon recovery from SOx poisoning. The exhaust emission control apparatus includes an NOx storage-reduction catalyst, a reducing agent supplying section for supplying a reducing agent to the NOx catalyst, an SOx poisoning recovering section for recovering the NOx catalyst from its SOx poisoning by varying the oxygen concentration of an exhaust by means of reducing agent supplying section, a hydrogen sulfide concentration estimating section for estimating a concentration of hydrogen sulfide in an atmosphere into which the hydrogen sulfide is discharged, and an estimated concentration derived reducing agent supply amount control section for decreasing an amount of reducing agent to be supplied in accordance with the increasing concentration of hydrogen sulfide estimated by the hydrogen sulfide concentration estimating section while the NOx catalyst is recovered from the sulfur oxide poisoning.

16 Claims, 7 Drawing Sheets

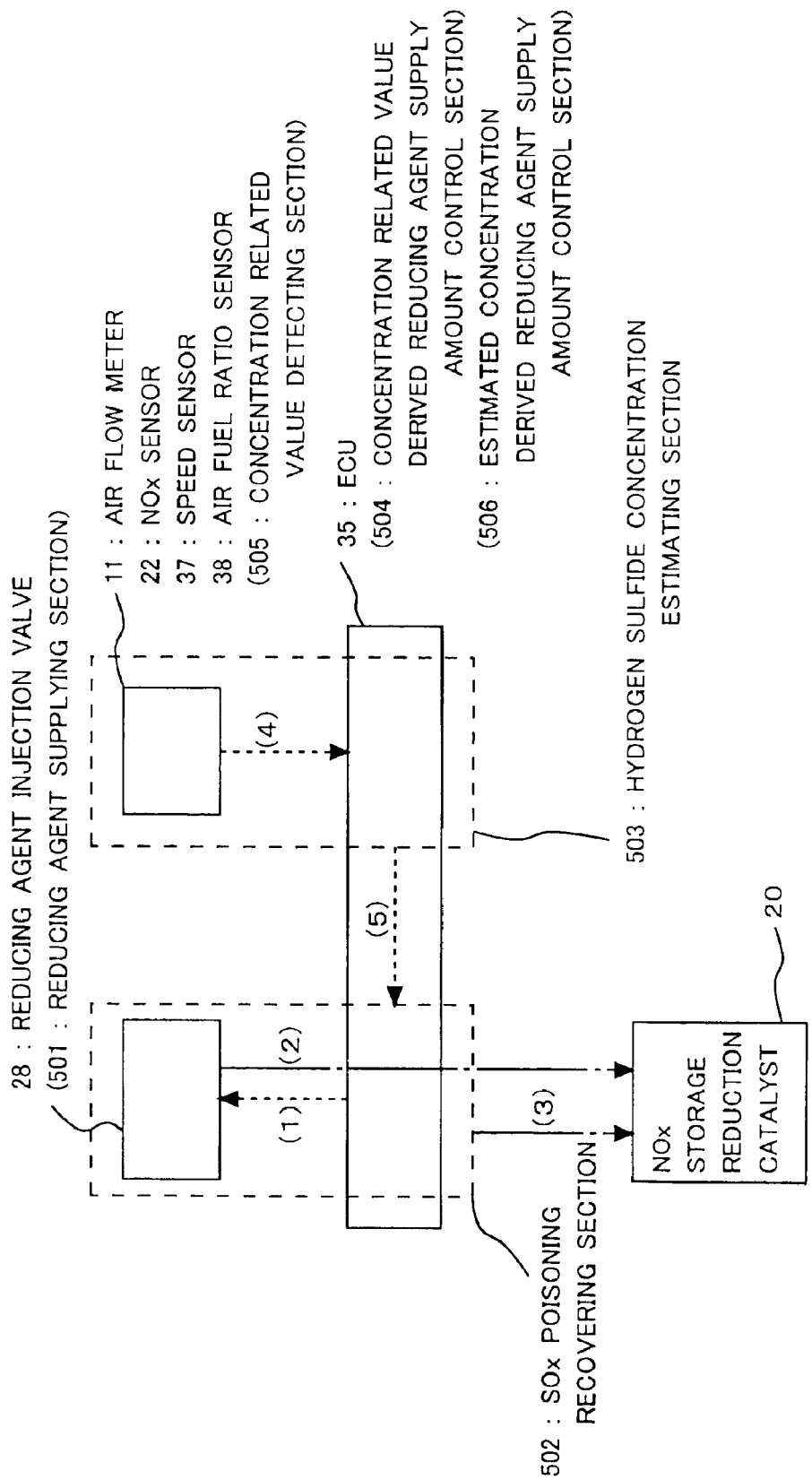

EXHAUST EMISSION CONTROL APPARATUS AND METHOD FOR INTERNAL COMBUSTION ENGINE

BACKGROUND OF THE INVENTION

1. Field of the Invention

The present invention relates to an exhaust emission control apparatus and method for an internal combustion engine.

2. Description of the Related Art

There have hitherto been known a technique in which when the amount of sulfur deposited on an NOx catalyst exceeds a predetermined amount, a nasty or unpleasant smell issued by the deposited sulfur is suppressed by varying the air fuel ratio of a mixture in an increasing or decreasing sense around a reference rich air fuel ratio (for example, see a first patent document: Japanese patent laid-open No. 2000-274232 (pages 3–5 and FIGS. 2 and 3)), another technique in which recovery of an NOx catalyst from its SOx poisoning is carried out at the time of idling or deceleration of a vehicle (for example, see a second patent document: Japanese patent laid-open No. 2002-38932 (pages 4–8 and FIGS. 3 and 4)), a further technique in which the air fuel ratio of a mixture is changed between a rich ratio and a lean ratio so as to recover an NOx catalyst from its SOx poisoning when the discharge or release speed of hydrogen sulfide in the course of recovery of the NOx catalyst from its SOx poisoning exceeds a predetermined speed (for example, see a third patent document: Japanese patent laid-open No. 2001-81237 (pages. 3–7 and FIGS. 2, 3 and 4)), and a still further technique in which the recovery of an NOx catalyst from its SOx poisoning is not performed at the time of idling or deceleration of a vehicle (for example, see a fourth patent document: Japanese patent laid-open No. 2000-161045 (pages 3–9 and FIGS. 5, 6 and 7)).

However, when an NOx catalyst is recovered from its SOx poisoning during the idling operation of an internal combustion engine, it will take time for the hydrogen sulfide discharged into an ambient atmosphere to be sufficiently diluted by or dispersed into the atmosphere, and hence there might be generated a nasty or unpleasant smell due to the hydrogen sulfide discharged into the atmosphere.

SUMMARY OF THE INVENTION

Accordingly, the present invention has been made in view of the above-mentioned problem, and has its object to provide a technique which is capable of suppressing a nasty smell due to the hydrogen sulfide generated when an NOx catalyst is recovered from its SOx poisoning in an exhaust emission control apparatus for an internal combustion engine.

To achieve the above object, according to one aspect, the present invention resides in an exhaust emission control apparatus for an internal combustion engine which comprises: an NOx catalyst adapted to occlude NOx when an oxygen concentration of an exhaust discharged from the internal combustion engine is higher than or equal to a predetermined value, and reduce the NOx occluded in the NOx catalyst in the existence of a reducing agent when the oxygen concentration of the exhaust is lower than the predetermined value; a reducing agent supplying section for supplying the reducing agent to the NOx catalyst; an SOx poisoning recovering section for recovering the NOx catalyst from its SOx poisoning by supplying the reducing agent through the reducing agent supplying section to vary the oxygen concentration of the exhaust passing through the NOx catalyst; a hydrogen sulfide concentration estimating section for estimating a concentration of hydrogen sulfide in an atmosphere into which the hydrogen sulfide is discharged; and an estimated concentration derived reducing agent supply amount control section for controlling an amount of reducing agent supplied from the reducing agent supplying section in such a manner that the amount of reducing agent to be supplied is decreased in accordance with the increasing concentration of hydrogen sulfide estimated by the hydrogen sulfide concentration estimating section while the NOx catalyst is recovered from the sulfur oxide poisoning.

The major feature of the present invention is that when the concentration of hydrogen sulfide ($H_2S$) in the atmosphere becomes high, the amount of reducing agent to be supplied is decreased to lower the concentration of the hydrogen sulfide, thereby suppressing the generation of a nasty or unpleasant smell.

In the exhaust emission control apparatus for an internal combustion engine thus constructed, the sulfur oxide in the exhaust is occluded into the NOx catalyst to generate its SOx poisoning. The SOx discharged from the NOx catalyst at the time of the NOx catalyst being recovered from its SOx poisoning is apt to be reduced to hydrogen sulfide by means of the reducing agent supplied during recovery of the NOx catalyst from its SOx poisoning. The hydrogen sulfide generated at this time, though limited in its amount, might cause a nasty smell.

Upon generation of hydrogen sulfide, the nasty smell of the hydrogen sulfide can be easily felt when the concentration thereof is high, but human sensitivity to such a nasty smell decreases in accordance with the decreasing concentration of hydrogen sulfide. Accordingly, when hydrogen sulfide, even if generated, is diluted to be lowered in its concentration, one can feel a nasty smell less often. Thus, in case where the dilution ratio of the hydrogen sulfide is low, the estimated concentration derived reducing agent supply amount control section decreases the amount of reducing agent to be supplied. As a result, the amount of hydrogen sulfide generated decreases, so it becomes possible to lower the concentration of the hydrogen sulfide to such a low dilution ratio at which one can not feel a nasty smell so often.

Here, decreasing the amount of reducing agent to be supplied may be carried out by lowering the injection pressure of the reducing agent.

Preferably, the hydrogen sulfide concentration estimating section estimates that the smaller the amount of the exhaust discharged from the internal combustion engine, the higher the concentration of hydrogen sulfide in the atmosphere is. Thus, as the amount of exhaust from the internal combustion engine increases, the hydrogen sulfide contained in the exhaust is diluted to be lowered in its concentration. Accordingly, in case of a limited amount of exhaust, the concentration of hydrogen sulfide in the atmosphere can be lowered by decreasing the amount of reducing agent to be supplied, whereby it becomes possible to suppress the generation of a nasty smell.

In this case, the amount of exhaust may be replaced by the amount of intake air.

Preferably, the exhaust emission control apparatus for an internal combustion engine is installed on a vehicle or movable device, and the hydrogen sulfide concentration estimating section estimates that the lower a moving speed of the vehicle, the higher the concentration of hydrogen sulfide in the atmosphere is. Here, note that as the moving speed of the vehicle is increasing, the hydrogen sulfide discharged into the atmosphere is diluted with an increasing amount of atmosphere and hence the concentration thereof is accordingly lowered. On the other hand, when the moving speed of the vehicle is low, the concentration of hydrogen sulfide in the atmosphere can be lowered by decreasing the amount of reducing agent to be supplied. As a result, it becomes possible to suppress the generation of a nasty smell. In addition, in cases where the moving speed of the vehicle is extremely low, the supply of reducing agent may be stopped, thereby suppressing the generation of a nasty smell.

Preferably, the hydrogen sulfide concentration estimating section can estimate that the higher a concentration of sulfur in fuel, the higher the concentration of hydrogen sulfide in the atmosphere is. Here, note that sulfur composition is contained in fuel, and the concentration thereof in the fuel is not constant. When the sulfur concentration of the fuel is high, a greater amount of sulfur oxides is occluded by an NOx catalyst so that a greater amount of hydrogen sulfide is generated during recovery of the NOx catalyst from SOx poisoning. Therefore, the concentration of the hydrogen sulfide in the atmosphere becomes high. Accordingly, when the sulfur concentration of the fuel is high, the concentration of hydrogen sulfide in the atmosphere can be lowered by decreasing the amount of reducing agent to be supplied, whereby the generation of a nasty smell can be suppressed.

In order to achieve the above-mentioned object, an exhaust emission control apparatus for an internal combustion engine according to another aspect of the present invention comprises: an NOx catalyst adapted to occlude NOx when an oxygen concentration of an exhaust is higher than or equal to a predetermined value, and reduce the NOx occluded in the NOx catalyst in the existence of a reducing agent when the oxygen concentration of the exhaust is lower than the predetermined value; a reducing agent supplying section for supplying the reducing agent to the NOx catalyst; an SOx poisoning recovering section for recovering the NOx catalyst from its SOx poisoning by supplying the reducing agent through the reducing agent supplying section to vary the oxygen concentration of the exhaust passing through the NOx catalyst; a concentration related value detecting section for detecting a value related to a concentration of hydrogen sulfide in an atmosphere into which the hydrogen sulfide is discharged while the SOx poisoning recovering section is recovering the NOx catalyst from its SOx poisoning; and a concentration related value derived reducing agent supply amount control section for controlling the amount of reducing agent to be supplied in such a manner that when the value detected by the concentration related value detecting section raises the concentration of hydrogen sulfide in the atmosphere higher than a predetermined concentration, the amount of reducing agent to be supplied is decreased until the concentration of hydrogen sulfide in the atmosphere is decreased to or below the predetermined concentration.

The concentration of hydrogen sulfide in the atmosphere varies owing to a variety of factors. These factors include, for example, an amount of intake air sucked into the internal combustion engine, a moving speed of a vehicle with the engine installed thereon, and a sulfur concentration of fuel. When any of these factors acts to increase the concentration of the hydrogen sulfide in the atmosphere above a prescribed concentration, there is a fear that a nasty smell due to the hydrogen sulfide might pose a problem. Such a nasty smell can be suppressed by decreasing the amount of reducing agent to be supplied. Here, by decreasing the amount of reducing agent to be supplied, the amount of hydrogen sulfide generated can be decreased to lower the concentration of hydrogen sulfide in the atmosphere. To this end, the reducing agent supply amount control section serves to decrease the amount of reducing agent to be supplied to such a level at which a nasty smell due to the hydrogen sulfide does not pose any problem. Thus, the concentration of hydrogen sulfide in the atmosphere can be decreased, thereby making it possible to suppress the generation of the nasty smell.

Preferably, the concentration related value detecting section detects an amount of intake air sucked into the internal combustion engine, and when the amount of intake air sucked into the internal combustion engine at the time of the NOx catalyst being recovered from its SOx poisoning by the SOx poisoning recovering section is smaller than an amount of intake air with which the concentration of hydrogen sulfide in the atmosphere is made lower than the predetermined concentration, the concentration related value derived reducing agent supply amount control section may decrease the amount of reducing agent to be supplied until the concentration of hydrogen sulfide in the atmosphere is decreased to or below the predetermined concentration.

As the amount of intake air sucked into the internal combustion engine decreases, the amount of exhaust discharged therefrom accordingly decreases. Therefore, the hydrogen sulfide in the exhaust is not diluted to a sufficient extent, and hence the concentration thereof increases so that the concentration of the hydrogen sulfide in the atmosphere also increases, thus giving rise to a fear that a nasty smell might be generated. Accordingly, in cases where an actual amount of intake air is less than an amount of intake air with which the problem of a nasty smell might be caused, the amount of reducing agent to be supplied is decreased to such a level as not to cause such a problem of a nasty smell. As a consequence, the concentration of hydrogen sulfide in the atmosphere can be decreased, thus making it possible to suppress the generation of a nasty smell.

In a preferred form, the amount of intake air may be replaced by the amount of exhaust.

Preferably, the exhaust emission control apparatus for an internal combustion engine is installed on a vehicle, and the concentration related value detection section detects a moving speed of the vehicle, and when the moving speed of the vehicle at the time of the NOx catalyst being recovered from its SOx poisoning by the SOx poisoning recovering section is lower than a moving speed of the vehicle at which the concentration of hydrogen sulfide in the atmosphere is made lower than the predetermined concentration, the concentration related value derived reducing agent supply amount control section may decrease the amount of reducing agent to be supplied until the concentration of hydrogen sulfide in the atmosphere is decreased below the predetermined concentration.

When the speed of the vehicle is low, the hydrogen sulfide discharged into the atmosphere is not diluted to a sufficient extent, so the concentration of the hydrogen sulfide in the atmosphere increases. As a result, the concentration of the hydrogen sulfide in the atmosphere also increases, thus giving rise to a fear that a nasty smell might be generated. Accordingly, in cases where an actual speed of the vehicle is less than a vehicle speed at which the problem of a nasty smell might be caused, the amount of reducing agent to be supplied is decreased to such a level as not to cause such a problem of a nasty smell. Consequently, the concentration of hydrogen sulfide in the atmosphere can be decreased, thus making it possible to suppress the generation of a nasty smell.

Preferably, the concentration related value detection section detects a concentration of sulfur in fuel, and when the concentration of sulfur in the fuel is higher than a sulfur concentration at which the concentration of hydrogen sulfide in the atmosphere is made lower than a predetermined concentration, the concentration related value derived reducing agent supply amount control section decreases an amount of fuel to be supplied by a predetermined amount at the time of the NOx catalyst being recovered from its SOx poisoning.

When the sulfur concentration of the fuel is high, the concentration of the hydrogen sulfide in the atmosphere becomes high, so there is a fear that a nasty smell might be generated. Accordingly, in cases where an actual concentration of the sulfur in fuel is higher than a sulfur concentration at which the problem of a nasty smell might be caused, the amount of reducing agent to be supplied is decreased to such a level as not to cause such a problem of a nasty smell, whereby, the concentration of hydrogen sulfide in the atmosphere can be decreased, thus making it possible to suppress the generation of a nasty smell.

According to a further aspect of the present invention, the above-mentioned object is achieved by an exhaust emission control method for an internal combustion engine comprising: a first step of detecting a value related to a concentration of hydrogen sulfide in an atmosphere into which the hydrogen sulfide is discharged when a reducing agent is supplied so as to recover the NOx catalyst from its SOx poisoning; and a second step for controlling an amount of reducing agent to be supplied in such a manner that when the value detected in the first step raises the concentration of hydrogen sulfide in the atmosphere higher than a predetermined concentration, the amount of reducing agent to be supplied is decreased by a predetermined amount so as to lower the concentration of hydrogen sulfide in the atmosphere to or below the predetermined concentration.

The concentration of hydrogen sulfide in the atmosphere varies owing to a variety of factors. These factors include, for example, an amount of intake air sucked into the internal combustion engine, a moving speed of a vehicle with the engine installed thereon, and a sulfur concentration of the fuel. When any of these factors acts to increase the concentration of the hydrogen sulfide in the atmosphere above a prescribed concentration, there is a fear that a nasty smell might pose a problem. Such a nasty smell can be suppressed by decreasing the amount of reducing agent to be supplied. That is, by decreasing the amount of reducing agent to be supplied, the amount of hydrogen sulfide generated can be decreased to lower the concentration of hydrogen sulfide in the atmosphere. Accordingly, the value related to the concentration of the hydrogen sulfide in the atmosphere is detected in the first step, and in cases where a nasty smell due to the hydrogen sulfide might pose a problem, the amount of reducing agent to be supplied is decreased in the second step. Thus, the generation of the nasty smell can be suppressed by decreasing the amount of reducing agent to be supplied.

Preferably, in the first step, an amount of intake air sucked into the internal combustion engine is detected as the value related to the concentration of hydrogen sulfide in the atmosphere into which the hydrogen sulfide is discharged, and in the second step, when the amount of intake air sucked into the internal combustion engine is smaller than a prescribed amount, the amount of reducing agent to be supplied is decreased by the predetermined amount so as to lower the concentration of hydrogen sulfide in the atmosphere to the predetermined concentration.

As the amount of intake air sucked into the internal combustion engine decreases, the amount of exhaust discharged therefrom accordingly decreases so that the hydrogen sulfide in the exhaust is not diluted to a sufficient extent, and hence the concentration thereof increases. As a result, the concentration of the hydrogen sulfide in the atmosphere also increases, thus giving rise to a fear that a nasty smell might be generated. Accordingly, in cases where an actual amount of intake air is less than an amount of intake air with which the problem of a nasty smell might be caused, the amount of reducing agent to be supplied is decreased to such a level as not to cause such a problem of a nasty smell. That is, by decreasing the amount of reducing agent to be supplied, the amount of hydrogen sulfide generated can be decreased to lower the concentration of hydrogen sulfide in the atmosphere. Accordingly, the generation of the nasty smell can be suppressed by decreasing the amount of reducing agent to be supplied.

In a preferred form, the amount of intake air may be replaced by the amount of exhaust.

Preferably, in the first step, a moving speed of the vehicle is detected as the value related to the concentration of hydrogen sulfide in the atmosphere into which the hydrogen sulfide is discharged, and in the second step, when the moving speed of the vehicle is smaller than a prescribed speed, the amount of reducing agent to be supplied is decreased by the predetermined amount so as to lower the concentration of hydrogen sulfide in the atmosphere to or below the predetermined concentration.

When the speed of the vehicle is low, the hydrogen sulfide discharged into the atmosphere is not diluted to a sufficient extent, so the concentration of the hydrogen sulfide in the atmosphere increases. As a result, the concentration of the hydrogen sulfide in the atmosphere also increases, thus giving rise to a fear that a nasty smell might be generated. Accordingly, in cases where an actual speed of the vehicle is less than a vehicle speed at which the problem of a nasty smell might be caused, the amount of reducing agent to be supplied is decreased to such a level as not to cause such a problem of a nasty smell. That is, by decreasing the amount of reducing agent to be supplied, the amount of hydrogen sulfide generated can be decreased to lower the concentration of hydrogen sulfide in the atmosphere. Accordingly, the generation of the nasty smell can be suppressed by decreasing the amount of reducing agent to be supplied.

Preferably, in the first step, a concentration of sulfur in fuel is detected as the value related to the concentration of hydrogen sulfide in the atmosphere into which the hydrogen sulfide is discharged, and in the second step, when the concentration of sulfur in fuel is higher than a prescribed concentration, the amount of reducing agent to be supplied is decreased by a predetermined amount so as to lower the concentration of hydrogen sulfide in the atmosphere to the predetermined concentration.

When the sulfur concentration of the fuel is high, the concentration of the hydrogen sulfide in the atmosphere accordingly becomes high. As a result, there is a fear that a nasty smell might be generated. Thus, in cases where an actual concentration of the sulfur in a fuel is higher than a sulfur concentration in a fuel at which the problem of a nasty smell might be caused, the amount of reducing agent to be supplied is decreased to such a level as not to cause such a problem of a nasty smell, That is, by decreasing the amount of reducing agent to be supplied, the amount of hydrogen sulfide generated can be decreased to lower the concentration of hydrogen sulfide in the atmosphere. Accordingly, the generation of the nasty smell can be suppressed by decreasing the amount of reducing agent to be supplied.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 7 is a functional block diagram showing the relation and functions of components of the exhaust emission control apparatus according to the present invention.

DESCRIPTION OF THE PREFERRED EMBODIMENTS

Now, preferred embodiments of the present invention will be described below in detail while referring to the accompanying drawings. Here, reference will be made to the case where an exhaust emission control apparatus for an internal combustion engine according to the present invention is applied to a diesel engine used for driving a vehicle. Specifically, the exhaust emission control apparatus for an internal combustion engine according to an embodiment of the present invention is installed on a movable device or vehicle.

(First Embodiment)

Figure 1:
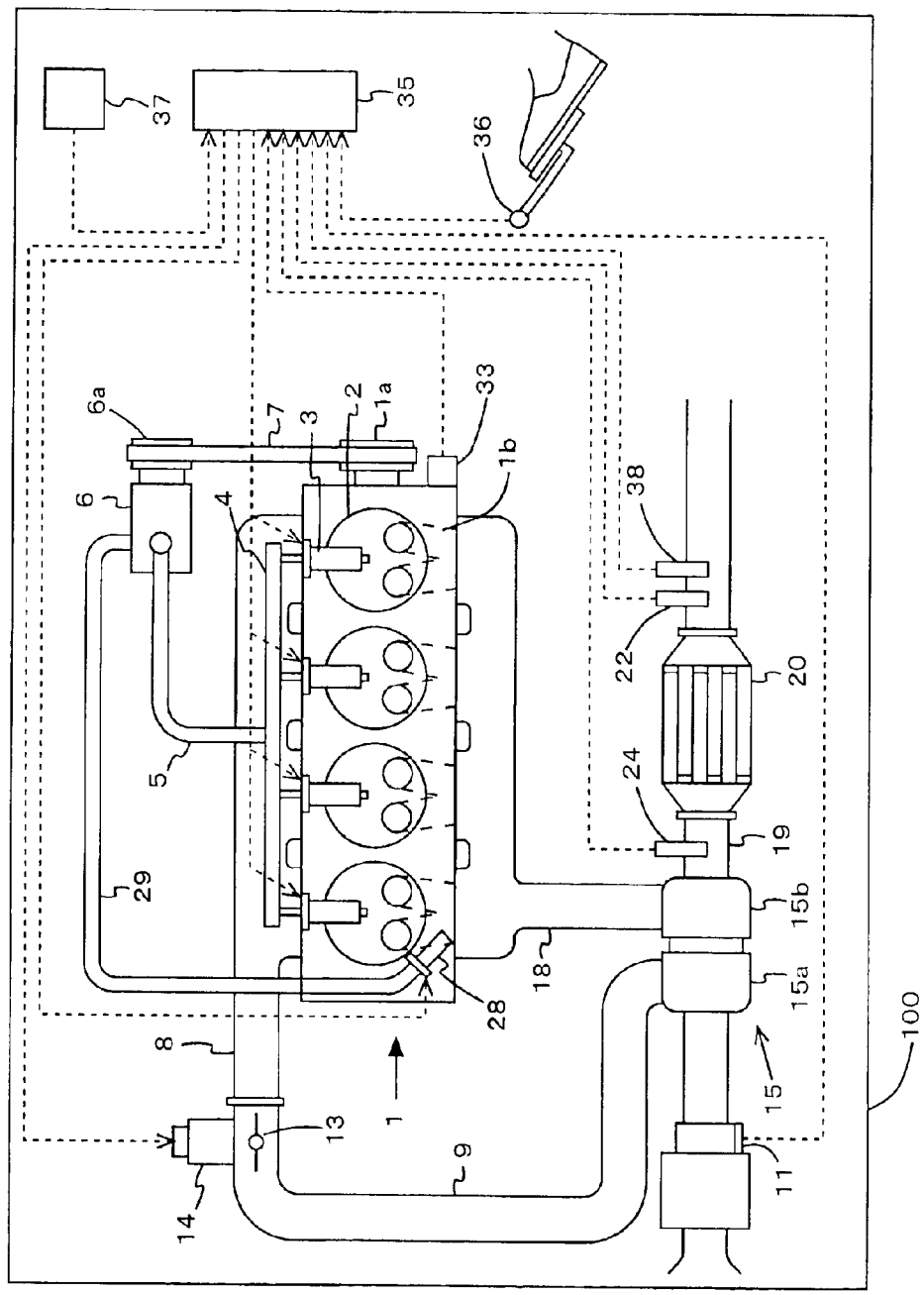
FIG. 1 is a view showing the schematic construction of an internal combustion engine to which an exhaust emission control apparatus with intake and exhaust systems according to a common embodiment of the present invention.

FIG. 1 is a view that shows the schematic construction of an internal combustion engine with its intake and exhaust systems, to which an exhaust emission control apparatus according to a first embodiment of the present invention is applied. FIG. 7 is a functional block diagram showing the relation and functions between components of the exhaust emission control apparatus according to a common embodiment of the present invention.

The internal combustion engine (hereinafter also referred simply to as an engine), illustrated in FIG. 1 and generally designated at reference numeral 1, is a water-cooled four-cycle diesel engine having four cylinders 2.

The engine 1 is provided with fuel injection valves 3, one for each cylinder 2, for directly injecting fuel into a combustion chamber of each cylinder 2. The respective fuel injection valves 3 are connected with an accumulator or common rail 4 that serves to accumulate the fuel to a prescribed pressure.

The common rail 4 is in communication with a fuel pump 6 through a fuel supply tube 5. The fuel pump 6 is driven to operate by a driving source in the form of the rotational torque of an output shaft or crankshaft of the engine 1. In addition, a pump pulley 6a mounted on an input shaft of the fuel pump 6 is operatively connected through a belt 7 with a crankshaft pulley 1a mounted on the crankshaft of the engine 1.

In the fuel injection system as constructed in this manner, the rotational torque of the crankshaft is transmitted to the input shaft of the fuel pump 6, so that the fuel pump 6 is driven to discharge fuel at a pressure corresponding to the rotational torque transmitted to the input shaft thereof.

The fuel discharged from the fuel pump 6 is supplied through the fuel supply tube 5 to the common rail 4, where it is accumulated to a prescribed pressure and then distributed to the fuel injection valves 3 of the respective cylinders 2. Thereafter, when a drive current is applied to the fuel injection valves 3, the fuel injection valves 3 are operated to open so that fuel is injected from the fuel injection valves 3 into the corresponding cylinders 2, respectively.

Next, an intake manifold 8 is connected with the engine or engine proper 1 in such a manner that it is in communication with the combustion chambers of the respective cylinders 2 through intake ports (not illustrated), respectively.

Connected with the intake manifold 8 is an intake pipe 9 with an air flow meter 11 mounted thereon for generating an electric signal corresponding to the mass of intake air flowing through the intake pipe 9.

A throttle valve 13 is disposed in the intake pipe 9 at a location immediately upstream of the intake manifold 8 for adjusting the flow rate of intake air flowing through the intake pipe 9. Attached to the throttle valve 13 is a throttle actuator 14 in the form of a step motor or the like for driving the throttle valve 13 to open and close.

A compressor housing 15a of a centrifugal supercharger (turbocharger) 15 adapted to be driven by a drive source in the form of the exhaust energy is arranged on the intake pipe 9 at a location between the air flow meter 11 and the throttle valve 13.

In the intake system as constructed in this manner, intake air flows into the compressor housing 15a through the intake pipe 9, so that it is compressed by the rotation of a compressor wheel disposed in the compressor housing 15a. The intake air thus compressed in the compressor housing 15a flows into the intake manifold 8 with the flow rate thereof being adjusted by the throttle valve 13 as necessary. The intake air flowing into the intake manifold 8 is then distributed therefrom to the combustion chambers of the respective cylinders 2 through branch conduits, respectively, so that it serves to burn the fuel that is injected from the fuel injection valves 3 of the respective cylinders 2 into the combustion chambers.

On the other hand, an exhaust manifold 18 is connected with the engine or engine proper 1 with its branch conduits being in communication with the combustion chambers of the respective cylinders 2 through exhaust ports 1b, respectively.

The exhaust manifold 18 is connected with the turbine housing 15b of the centrifugal supercharger 15, which is in turn connected with an exhaust pipe 19 that leads, at a downstream side thereof, into the atmosphere.

An NOx storage-reduction catalyst 20 (hereinafter simply referred to as an NOx catalyst) is arranged on the exhaust pipe 19, and is formed of a porous material such as, for example, cordierite. More specifically, the NOx catalyst 20 includes a carrier formed of alumina for example, and a first and a second component member carried on the carrier, the first component member comprising at least one selected from alkali metals such as potassium (K), sodium (Na), lithium (Li), cesium (Cs) or the like, alkaline earths such as barium (Ba), calcium (Ca) or the like, and rare earths such as lantern (La), yttrium (Y) or the like, the second component member comprising a noble metal such as platinum (Pt) or the like. Here, note that in the first embodiment, the NOx catalyst 20 may have barium (Ba) and platinum (Pt) carried on the carrier made of alumina, with a transition metal such as, for instance, ceria ($CeO_2$) or the like having oxygen storage capability ($O_2$ storage).

When the oxygen concentration of the exhaust flowing into the NOx catalyst 20 is high, the NOx catalyst 20 occludes nitrogen oxides (NOx) contained in the exhaust, whereas when the oxygen concentration of the exhaust flowing into the NOx catalyst 20 is low, the NOx occluded in the NOx catalyst 20 is discharged therefrom. At that time, if reducing compositions such as hydrocarbon (HC), carbon monoxide (CO) or the like exist in the exhaust, the NOx discharged from the NOx catalyst 20 is reduced by the reducing compositions. In addition, a transition metal such as ceria ($CeO_2$) temporarily holds oxygen according to the characteristic of the exhaust, and has the capability of discharging this oxygen as activated oxygen.

An exhaust temperature sensor 24 is mounted on the exhaust pipe 19 at a location upstream of the NOx catalyst 20 for generating an output electric signal corresponding to the temperature of the exhaust flowing through the exhaust pipe 19. Also, an NOx sensor 22 is mounted on the exhaust pipe 19 at a location downstream of the NOx catalyst 20 for generating an output electric signal corresponding to the NOx concentration of the exhaust flowing through the exhaust pipe 19.

In the exhaust system as constructed in this manner, the air fuel mixture (burnt gas) combusted in the respective cylinders 2 of the engine 1 is discharged as an exhaust into the exhaust manifold 18 through the exhaust ports 1b. Then, the exhaust flows from the exhaust manifold 18 into the turbine housing 15b of the centrifugal supercharger 15, so that the exhaust flowing into the turbine housing 15b drives the turbine wheel received in and rotatably supported by the turbine housing 15b while making use of the energy of the exhaust. In that case, the rotational torque of the turbine wheel is transmitted to the compressor wheel which is disposed in the compressor housing 15a and coupled with the turbine wheel.

The exhaust discharged from the turbine housing 15b flows into the NOx catalyst 20 through the exhaust pipe 19, and the NOx contained in the exhaust is occluded by the NOx catalyst 20. Thereafter, the exhaust is discharged into an ambient atmosphere while passing through the exhaust pipe 19.

Incidentally, when the engine 1 is operated with a lean mixture, the air fuel ratio of the exhaust discharged from the engine 1 becomes a lean atmosphere, and hence the oxygen concentration of the exhaust becomes high. As a result, the NOx contained in the exhaust is occluded by the NOx catalyst 20. However, when the lean burn operation of the engine 1 continues for a long period of time, the NOx occlusion capability of the NOx catalyst is saturated, as a consequence of which the NOx in the exhaust will be discharged into the atmosphere without being occluded by the NOx catalyst.

Particularly, in a diesel engine such as the engine 1, the air fuel mixture of a lean air fuel ratio is burnt or combusted in the most part of the engine operating range, and the air fuel ratio of the exhaust according becomes lean in the most part of the engine operating range. Therefore, the NOx occlusion capability of the NOx catalyst is liable to be saturated. In this connection, note that the lean air fuel ratio stated herein means a range of 20–50 for example in the diesel engine, in which NOx cannot be purified by a three way catalyst.

Accordingly, when the engine 1 is under a lean burn operation, it is necessary to lower the oxygen concentration of the exhaust flowing into the NOx catalyst and at the same time to increase the concentration of the reducing agent, thereby reducing the NOx occluded in the NOx catalyst before the NOx occlusion capability of the NOx catalyst is saturated.

As a method of decreasing the oxygen concentration of the exhaust in this manner, there is exemplified a method of adding fuel to the exhaust, or a low-temperature combustion method in which the amount of EGR (exhaust gas recirculation) gas is increased rather than the amount of soot generated becomes a maximum (Japanese patent No. 3116876), or a fuel sub-injection method of re-injecting fuel during the expansion stroke after main injection in which fuel is injected for generation of engine output power. For example, in the method of adding fuel to the exhaust, provision is made for a reducing agent supplying mechanism which serves to add a reducing agent in the form of fuel (light oil) to the exhaust flowing through the exhaust pipe 19 at a location upstream of the NOx catalyst 20. By adding fuel from the reducing agent supplying mechanism to the exhaust, the oxygen concentration of the exhaust flowing into the NOx catalyst 20 can be lowered, and the concentration of the reducing agent can be increased.

As shown in FIG. 1, the reducing agent supplying mechanism is arranged with its injection opening being present in the exhaust manifold 18, and includes a reducing agent injection valve 28 (reducing agent supplying section 501) that is adapted to be opened to inject fuel by means of a signal from an ECU (Electronic Control Unit) 35 to be described later, and a reducing agent supplying passage 29 which serves to introduce the fuel discharged from the fuel pump 6 to the reducing agent injection valve 28.

In such a reducing agent supplying mechanism, the fuel under high pressure discharged from the fuel pump 6 is supplied to the reducing agent injection valve 28 through the reducing agent supplying passage 29, so that the reducing agent injection valve 28 is opened by a signal from the ECU 35 (see line (1) in FIG. 7) to inject a reducing agent in the form of the fuel into the exhaust manifold 18.

The reducing agent injected from the reducing agent injection valve 28 into the exhaust manifold 18 reaches the NOx catalyst 20 (see line (2) in FIG. 7) while serving to lower the oxygen concentration of the exhaust flowing into the exhaust manifold 18 from upstream thereof. As a result, the NOx occluded in the NOx catalyst 20 is reduced under the action of the reducing agent. Here, note that the reducing agent supplying section 501 may be constituted by the above-mentioned low-temperature combustion or the above-mentioned sub-injection.

Thereafter, the reducing agent injection valve 28 is closed by a signal from the ECU 35, whereby the addition of the reducing agent to the exhaust manifold 18 is stopped.

Moreover, a crank position sensor 33 is mounted on the engine 1 for generating an output electric signal corresponding to the rotational position of the crankshaft.

The ECU 35 for controlling the engine 1 is provided in conjunction with the engine 1 as constructed in the above-described manner. The ECU 35 controls the operating state of the engine 1 according to the operating conditions of the engine 1 and the driver's request.

A variety of kinds of sensors are electrically connected to the ECU 35 through electric wiring. Also, an output signal of an accelerator opening (or depression amount) sensor 36, which generates an output electric signal corresponding to the amount of operation of an accelerator pedal depressed by the driver, is input to the ECU 35 in addition to the above-mentioned sensor signals.

On the other hand, the fuel injection valve 3, the throttle actuator 14, the reducing agent injection valve 28, etc., are connected to the ECU 35 through electric wiring, so that they can be controlled by the ECU 35.

For example, in the NOx purification control operation, so-called rich spike control is executed so as to lower the oxygen concentration of the exhaust flowing into the NOx catalyst 20 at a relatively short period in a spike-like manner (for a short time).

In the rich spike control, the ECU 35 determines at a prescribed period whether a rich spike control executing condition holds. As the rich spike control execution condition, there are exemplified the following conditions for example. That is, the NOx catalyst 20 is in its active state; the value of the output signal of the exhaust temperature sensor 24 is less than or equal to a prescribed upper limit; and no poisoning removal control is executed.

When it is determined that the rich spike control execution condition as described above holds, the ECU 35 controls the reducing agent injection valve 28 so as to inject a reducing agent in the form of fuel therefrom in a spike-like manner, whereby the ECU 35 temporarily controls the air fuel ratio of the exhaust flowing into the NOx catalyst 20 to be a prescribed target rich air fuel ratio.

Specifically, the ECU 35 reads out the number of revolutions per minute of the engine, the output signal of the accelerator opening sensor 36 (the degree of opening of the accelerator), the value of the output signal of the air flow meter 11 (the amount of intake air), the output signal of an air fuel ratio sensor (not shown), the amount of fuel to be injected, etc., all stored in memory.

The ECU 35 accesses a reducing agent addition amount control map while using as parameters the number of revolutions per minute of the engine, the degree of opening of the accelerator, the amount of intake air, and the amount of fuel to be injected, as stated above, and calculates an amount of addition (a target amount of addition) of the reducing agent required to make the air fuel ratio of the exhaust equal to the target air fuel ratio that is set beforehand.

Subsequently, the ECU 35 accesses a reducing agent injection valve control map while using as a parameter the above-mentioned target amount of addition, and calculates a valve-opening time (a target valve-opening time) of the reducing agent injection valve 28 required to inject a target amount of addition of the reducing agent from the reducing agent injection valve 28.

The ECU 35 opens the reducing agent injection valve 28 for the target valve-opening time of the reducing agent injection valve 28 thus calculated.

When the target valve-opening time has elapsed from the time point at which the reducing agent injection valve 28 is opened, the ECU 35 closes the reducing agent injection valve 28.

Thus, while the reducing agent injection valve 28 is opened just for the target valve-opening time, the target amount of addition of fuel is injected from the reducing agent injection valve 28 into the exhaust manifold 18. The reducing agent injected from the reducing agent injection valve 28 is mixed with the exhaust flowing from upstream of the exhaust manifold 18 to form an air fuel mixture having the target air fuel ratio, which then flows into the NOx catalyst 20.

As a consequence, the oxygen concentration of the exhaust flowing into the NOx catalyst 20 changes at a relatively short period, and hence the air fuel ratio of the exhaust accordingly changes, too, whereby the NOx catalyst 20 alternately repeats occluding and reducing the NOx at a short period.

Thus, the air fuel ratio of the exhaust flowing into the NOx catalyst 20 is controlled to a target rich air fuel ratio in a spike-like manner, so that the NOx absorbed in the NOx storage-reduction catalyst can be reduced.

Subsequently, in the SOx poisoning removal control, the ECU 35 performs SOx poisoning removal processing so as to remove or eliminate the poisoning of the NOx catalyst 20 due to the sulfur oxide.

Here, note that sulfur (S) might be contained in the fuel for the engine 1, and in this case, when such a fuel is combusted in the engine 1, sulfur oxides (SOx) such as sulfur dioxide ($SO_2$), sulfur trioxides ($SO_3$) will be generated.

The sulfur oxides (SOx) thus generated flow into the NOx catalyst 20 together with the exhaust, so that they are absorbed by the NOx storage-reduction catalyst under the same mechanism as in the case of nitrogen oxides (NOx).

Concretely, when the oxygen concentration of the exhaust flowing into the NOx catalyst 20 is high, sulfur oxides (SOx) such as sulfur dioxides ($SO_2$), sulfur trioxides ($SO_3$) or the like in the incoming exhaust gas are oxidized on the surface of platinum (Pt) and absorbed into the NOx catalyst 20 as in the form of sulfate ions ($SO_4^{2-}$). In addition, the sulfate ions ($SO_4^{2-}$) absorbed into the NOx catalyst 20 are combined with barium oxide (BaO) to form sulfate ($BaSO_4$).

Incidentally, it is to be noted that sulfate ($BaSO_4$) is more stable in comparison with nitric acid barium ($Ba(NO_3)_2$) and hence is not resolved or decomposed easily. Accordingly, the sulfate remains unresolved in the NOx catalyst 20 even if the oxygen concentration of the exhaust flowing into the NOx catalyst 20 lowers.

As the amount of sulfate ($BaSO_4$) in the NOx catalyst 20 increases, the amount of barium oxide (BaO), which is able to take part in the absorption of the NOx, decreases accordingly, so there takes place so-called SOx poisoning in which the NOx absorption capability of the NOx catalyst 20 lowers.

The following methods are exemplified as a method of removing or eliminating the SOx poisoning of the NOx catalyst 20. That is, by raising the temperature of the atmospheric temperature of the NOx catalyst 20 to a high temperature range of from about 600° C. to 700° C., and at the same time lowering the oxygen concentration of the exhaust flowing into the NOx catalyst 20, the barium sulfate ($BaSO_4$) absorbed in the NOx catalyst 20 can be thermally resolved or decomposed into $SO_3^-$ or $SO_4^-$. Then, the $SO_3^-$ or $SO_4^-$ thus decomposed is reacted with hydrocarbon (HC) or carbon monoxide (CO) in the exhaust so that it is reduced to gaseous $SO_2^-$.

For example, the ECU 35 controls the reducing agent injection valve 28 so that fuel is added from the reducing agent injection valve 28 to the exhaust. As a result, the fuel composition is oxidized in the NOx catalyst 20 to generate heat, by which the bed temperature of the NOx catalyst 20 is raised. At the same time, fuel may be secondarily injected from the fuel injection valve 3 on the expansion stroke of each cylinder.

By the addition of fuel, the bed temperature of the NOx catalyst 20 is raised to a high temperature range of about 600° C. to 650° C. Thereafter, fuel is continuously injected from the reducing agent injection valve 28 under the control of the ECU 35 so as to reduce the oxygen concentration of the exhaust flowing into the NOx catalyst 20. Thus, the reducing agent injection valve 28 and the ECU 35 together constitute an SOx poisoning recovering section 502 in this embodiment.

When the poisoning recovery processing is executed in this manner, the oxygen concentration of the exhaust flowing into the NOx catalyst 20 decreases under the situation where the bed temperature of the NOx catalyst 20 is high, so that barium sulfate ($BaSO_4$) occluded in the NOx catalyst 20 is thermally decomposed into $SO_3^-$ and $SO_4^-$, which are then subjected to reduction through reactions with hydrocarbon (HC) or carbon monoxide (CO) in the exhaust. Thus, the SOx poisoning of the NOx catalyst 20 is recovered (see line (3) in FIG. 7).

Here, note that in this embodiment, the above-mentioned rich spike control is performed as the SOx poisoning recovery processing to lower the oxygen concentration of the exhaust, and one rich spike comprises a plurality of fuel injections so as to prevent the excessive richness of the air fuel ratio. Here, there is a fear that when a large amount of fuel is injected at one time, the air fuel ratio may become too rich, thus permitting a part of the fuel unable to react with the NOx catalyst 20 to flow out to downstream of the NOx catalyst 20. Accordingly, in this embodiment, a fuel rich atmosphere is formed while suppressing the overrichness thereof, by injecting a small amount of fuel in a plurality of times.

Figure 2:
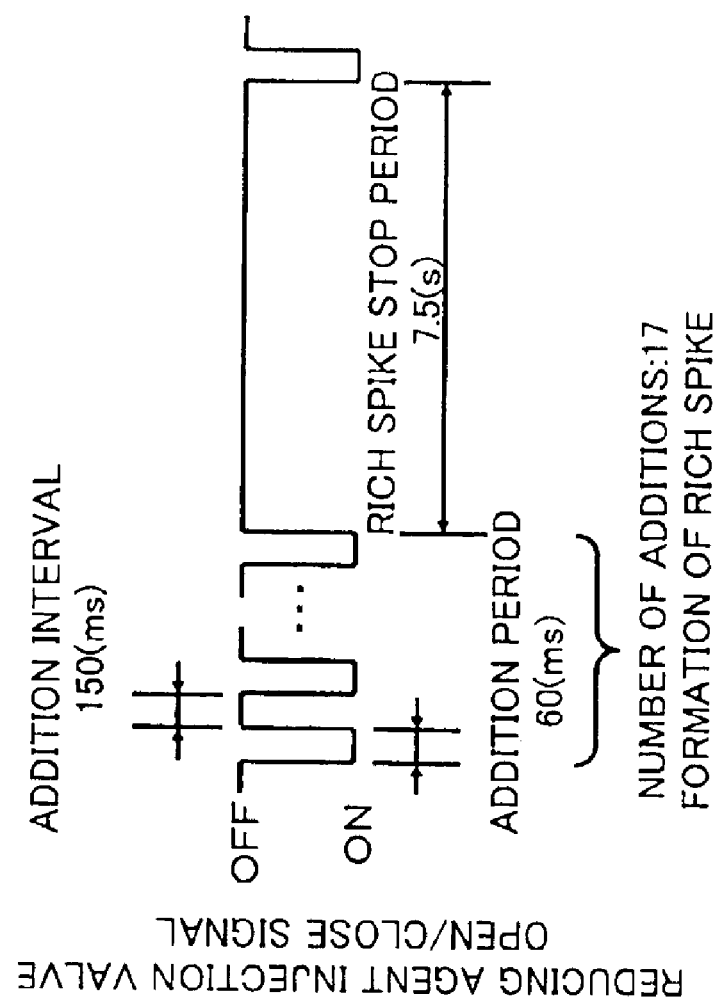
FIG. 2 is a view showing a drive (open/close) signal for a reducing agent injection valve at the time of rich spike control.

Here, FIG. 2 is a view showing a signal for opening or closing the reducing agent injection valve 28 at the time of rich spike control. The reducing agent injection valve 28 is closed when the signal is turned off, and opened when the signal is turned on.

As shown in FIG. 2, one rich spike comprises 17 injections of fuel for example, and a valve-opening time for one injection of the reducing agent injection valve 28 is 60 ms for example, and the reducing agent injection valve 28 is closed for a period of time of 150 ms after each opening thereof. One rich spike as a whole is formed by repeating 17 times of such a pair of opening and closing of the reducing agent injection valve 28. Thus, it is possible to suppress the overrichness of the air fuel ratio by forming one rich spike comprising a plurality of times of fuel injections. Accordingly, it is possible to decrease the amount of fuel flowing out to downstream of the NOx catalyst 20 without reacting therewith. In addition, such rich spike is repeatedly formed at a rich spike stop period of 7.5 seconds (i.e., at intervals of 7.5 s) for example. The rich spike stop period serves to suppress the overheating of the NOx catalyst 20, thereby making it possible to suppress the generation of thermal degradation of the NOx catalyst 20.

Incidentally, the sulfur oxides discharged from the NOx catalyst 20 during its recovery from the SOx poisoning can be easily changed into hydrogen sulfide in a reducing atmosphere. Since such hydrogen sulfide causes a nasty smell, it is necessary to suppress the generation of hydrogen sulfide.

Here, the amount of sulfur oxides discharged from the NOx catalyst 20 during its recovery from the SOx poisoning is determined by the bed temperature of the NOx catalyst 20, the oxygen concentration of the exhaust, and the duration time of a rich air fuel ratio. When the amount of air sucked into the engine 1 is small, the amount of exhaust discharged from the engine 1 also decreases, so the concentration of sulfur oxide discharged becomes high. As a result, the concentration of the hydrogen sulfide discharged from the engine 1 into the atmosphere also becomes high, and hence the intensity of a nasty smell generated by the hydrogen sulfide increases.

Accordingly, in this embodiment of the present invention, when the amount of air sucked into the engine 1 is small, it is assumed that the amount of exhaust is limited, and hence there is a fear that a nasty smell may be generated. Therefore, a reducing agent supply time when the NOx catalyst 20 is recovered from its SOx poisoning is shortened whereby the amount of emissions of hydrogen sulfide can be reduced, thereby suppressing the generation of the nasty smell. Here, note that the reducing agent supply time stated herein means the time of supplying a reducing agent for one rich spike. In this embodiment in which one rich spike is formed by injecting a reducing agent in a plurality of times, the time or duration of one rich spike can be changed by increasing or decreasing the number of times of injections (injection frequency) of the reducing agent to be injected for one rich spike, so that the amount of reducing agent to be supplied can be changed by increasing or decreasing the injection frequency of the reducing agent. That is, shortening the reducing agent supply time means that the frequency or number of injections for one rich spike is decreased to less than 17 for instance in this embodiment, and this also means that the amount of reducing agent to be supplied is decreased.

In this embodiment, the amount of reducing agent to be supplied may be decreased by decreasing the amount of reducing agent to be injected for one rich spike without changing the injection frequency of the reducing agent to be injected for one rich spike. Moreover, such a change may be made by combining increasing or decreasing the injection frequency of reducing agent and increasing or decreasing the amount of reducing agent to be injected.

In addition, there is a correlation between the amount of air sucked into the engine 1 and the number of revolutions per minute of the engine 1. Therefore, the reducing agent supply time may be shortened when the number of revolutions per minute of the engine is small, i.e., less than a prescribed threshold level.

Here, it is to be noted that in this embodiment, by shortening the reducing agent supply time by decreasing the number of additions of a reducing agent for one rich spike, the amount of hydrogen sulfide generated is decreased but the rich spike stop period is not changed. Therefore, the concentration of hydrogen sulfide will be lowered due to diffusion thereof in the exhaust pipe 19 by the time when the hydrogen sulfide is discharged from the exhaust pipe 19 into the atmosphere, as a result of which the generation of a nasty smell due to the hydrogen sulfide can be suppressed.

Next, reference will be made to a control flow for determining the reducing agent supply time when the NOx catalyst is recovered from its SOx poisoning according to this embodiment.

Figure 3:
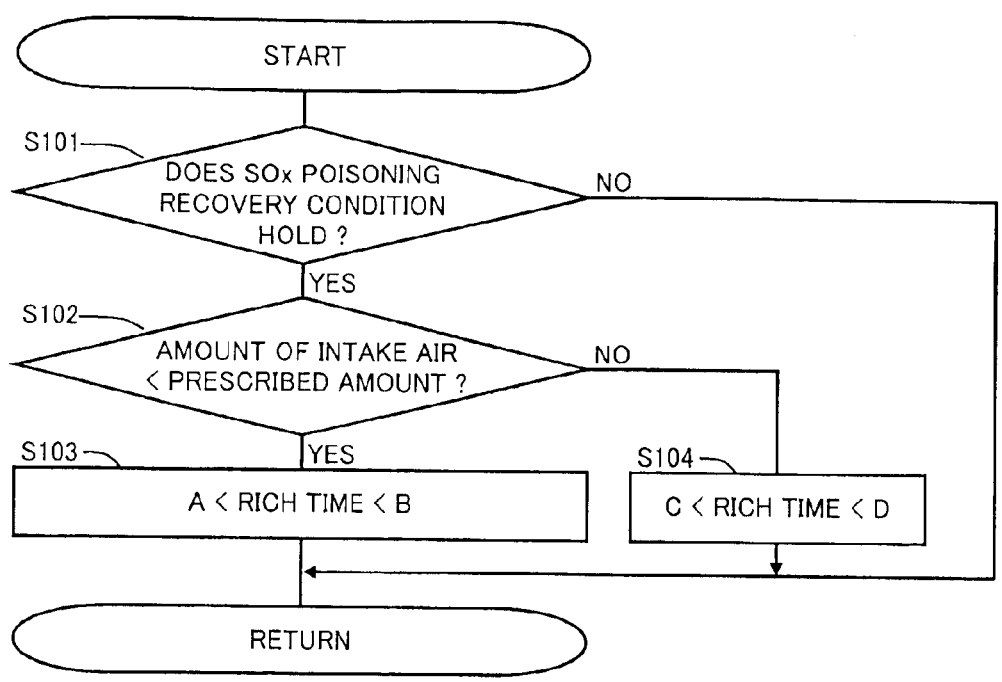
FIG. 3 is a flow chart showing a control flow for determining a reducing agent supply time during recovery of an NOx catalyst from SOx poisoning according to a first embodiment of the present invention.

FIG. 3 is a flow chart showing such a control flow. In this figure, in step S101, the ECU 35 determines whether an SOx poisoning recovery condition holds. The following are exemplified as such a determination condition or criterion. That is, whether the engine 1 is in an operating state suitable for SOx poisoning recovery, or whether the temperature of the NOx catalyst 20 is at a temperature (for example 600–700° C.) suitable for SOx poisoning recovery, or whether the amount of sulfur oxides occluded in the NOx catalyst 20 exceeds a specified amount. Here, the amount of sulfur oxide occlusion can be obtained based on the amount of fuel consumption, an output signal from an NOx sensor 22, the mileage (distance of travel) of the vehicle 100, or the like. Further, since the NOx catalyst 20 is poisoned by the sulfur composition in fuel, the accumulated amount of consumption of the fuel may be calculated by and stored in the ECU 35, so that the amount of sulfur oxide occlusion may be obtained based on the accumulated amount of consumption of the fuel thus calculated. In addition, as the SOx poisoning progresses, the amount of NOx occlusion of the NOx storage-reduction catalyst decreases so that the amount of NOx in the exhaust flowing to downstream of the NOx catalyst 20 increases. Accordingly, the NOx sensor 22 may be arranged at a location downstream of the NOx catalyst 20 for detecting the concentration of NOx contained in the exhaust, so that the amount of sulfur oxide occluded in the NOx catalyst 20 can be obtained based on an output signal of the NOx sensor 22. Furthermore, assuming that the amount of sulfur oxide occlusion in the NOx catalyst 20 increases in proportion to the mileage of the vehicle 100, the amount of sulfur oxide occlusion may be calculated based on the mileage of the vehicle 100.

When an affirmative determination is made in step S101, the control flow proceeds to step S102, whereas when a negative determination is made in step S101, this routine is ended.

In step S102, the ECU 35 determines whether the amount of air sucked into the engine 1 is less than a prescribed amount X. Here, this determination is made by using the amount of intake air related to the concentration of hydrogen sulfide in the atmosphere. Here, the amount of air sucked into the engine 1 can be obtained based on the output signal of the air flow meter 11. That is, the air flow meter 11 constitutes a concentration related value detecting section 505 according to the present invention. The output signal of the air flow meter 11 is input to the ECU 35 (see line (4) in FIG. 7). A specific range of the hydrogen sulfide concentration of the exhaust discharged from the engine 1 into the ambient atmosphere, in which a nasty smell caused by the hydrogen sulfide in the exhaust poses no problem, is found in advance by experiments or the like, and the prescribed amount X is determined based on the specific range of the hydrogen sulfide concentration of the exhaust thus found.

When an affirmative determination is made in step S102, the control flow proceeds to step S103, whereas when a negative determination is made in step S103, the control flow proceeds to step S104.

In step S103, the ECU 35 sets the reducing agent supply time in a range (rich time) from a first predetermined time A to a second predetermined time B. The first predetermined time A and the second predetermined time B are the reducing agent supply times within a range in which a nasty smell due to the hydrogen sulfide in the exhaust poses no problem, and they are obtained beforehand through experiments, etc. Here, note that the ECU 35, which sets the reducing agent supply times within the range in which a nasty smell due to the hydrogen sulfide in the exhaust poses no problem, constitutes a concentration related value derived reducing agent supply amount control section 504 according to the present invention (see line (5) in FIG. 7).

In step S104, the ECU 35 sets the reducing agent supply time in a range (rich time) from a third predetermined time C to a fourth predetermined time D. The third predetermined time C and the fourth predetermined time D are the reducing agent supply times in a range where SOx poisoning recovery can be carried out to a maximum extent, and they are obtained beforehand through experiments, etc. In this connection, the second predetermined time B and the third predetermined time C may be the same.

Thus, when the amount of air sucked into the engine 1 is small, the generation of hydrogen sulfide can be suppressed by shortening the supply time of the reducing agent, thus making it possible to suppress the generation of a nasty smell.

As described in the foregoing, according to this embodiment, in cases where the amount of intake air is so limited as likely to cause a nasty smell, it is possible to suppress the generation of such a nasty smell by shortening the reducing agent supply time. In addition, the SOx poisoning recovery processing is stopped when a nasty smell might be generated in the prior art, but according to this embodiment, SOx poisoning can be recovered even with a small amount of reducing agent, whereby the amount of fuel consumption can be suppressed to a minimum, thus making it possible to suppress the deterioration of fuel economy.

Moreover, although in this embodiment, the amount of reducing agent to be supplied is decreased when the amount of intake air is less than the prescribed amount X, the concentration of hydrogen sulfide in the atmosphere may instead be estimated based on the amount of intake air sucked into the engine 1, so that the amount of reducing agent to be supplied can be decreased when the concentration of hydrogen sulfide thus estimated is higher than or equal to a predetermined value. Here, the relation between the amount of intake air sucked into the engine 1 and the concentration of hydrogen sulfide in the atmosphere may be determined in advance through experiments or the like, so that the concentration of hydrogen sulfide can be obtained by using a map that is prepared based on the relation thus determined. In this case, the air flow meter 11 for obtaining the amount of intake air sucked into the engine 1 and the ECU 35 that estimates the concentration of hydrogen sulfide in the atmosphere together constitute a hydrogen sulfide concentration estimating section 503 according to the present invention. In addition, the ECU 35, which sets the reducing agent supply time in the range in which a nasty smell due to the hydrogen sulfide in the exhaust does not pose any problem, constitutes an estimated concentration derived reducing agent supply amount control section 506 according to the present invention.

(Second Embodiment)

A second embodiment of the present invention differs from the above-mentioned first embodiment in that a determination condition or criterion for determining whether the reducing agent supply time is shortened is the running speed of the vehicle 100, but the basic construction of the other hardware in this second embodiment is common with that of the first embodiment, and hence an explanation thereof is omitted.

Here, note that if the SOx poisoning recovery processing is carried out, there is a fear that hydrogen sulfide might be generated. However, even if hydrogen sulfide should be generated, it is possible to suppress the generation of a nasty smell if the hydrogen sulfide thus generated is diluted with the atmosphere. In this connection, as the running speed of the vehicle 100 with the engine 1 installed thereon increases, the hydrogen sulfide discharged from the exhaust pipe 19 is diluted with a greater amount of atmosphere, so that the concentration of hydrogen sulfide in the atmosphere is lowered. Accordingly, when the vehicle speed is low, i.e., when the dilution of hydrogen sulfide due to the atmosphere cannot be expected, the generation of hydrogen sulfide can be suppressed by decreasing the amount of reducing agent to be supplied, whereby the generation of a nasty smell due to the hydrogen sulfide can be suppressed.

Now, reference will be made to a control flow for determining the reducing agent supply time when the NOx catalyst is recovered from its SOx poisoning according to this second embodiment.

Figure 4:
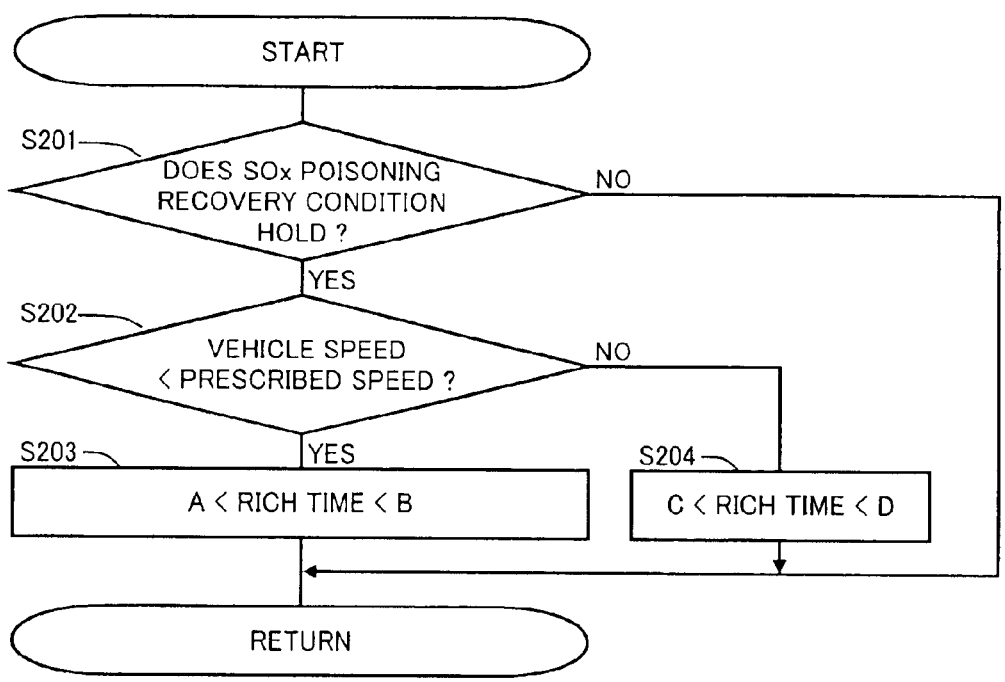
FIG. 4 is a flow chart showing a control flow for determining a reducing agent supply time during recovery of an NOx catalyst from SOx poisoning according to a second embodiment of the present invention.

FIG. 4 is a flow chart showing such a control flow. In this figure, in steps S201, S203 and S204, the processes similar to those in steps S101, S103 and S104 in the control flow shown in FIG. 3 of the first embodiment are respectively carried out.

In step S202, it is determined whether the running speed of the vehicle 100 with the engine 1 installed thereon is lower than a prescribed speed Y. Here, this determination is made by using the running speed of the vehicle 100 related to the concentration of hydrogen sulfide in the atmosphere. In this connection, note that the vehicle speed is obtained by a speed sensor 37 that generates an output signal corresponding to the running speed of the vehicle 100. Also, a specific range of the hydrogen sulfide concentration of the exhaust, in which a nasty smell due to the hydrogen sulfide in the exhaust poses no problem, is found in advance by experiments or the like, and a prescribed speed Y is determined based on the specific range of the hydrogen sulfide concentration of the exhaust thus found. That is, the speed sensor 37 constitutes the concentration related value detecting section 505 according to the present invention. The output signal of the speed sensor 37 is input to the ECU 35 (see line (4) in FIG. 7).

Here, note that the vehicle speed may instead be obtained from a signal from a transmission in place of the signal of the speed sensor 37.

When an affirmative determination is made in step S202, the control flow proceeds to step S203, whereas when a negative determination is made in step S203, the control flow proceeds to step S204.

Thus, when the speed of the vehicle 100 with the engine 1 installed thereon is small, the generation of hydrogen sulfide can be suppressed by shortening the supply time of the reducing agent, thus making it possible to suppress the generation of a nasty smell.

Moreover, in this embodiment, the supply time of the reducing agent may be further subdivided according to the vehicle speed.

Figure 5:
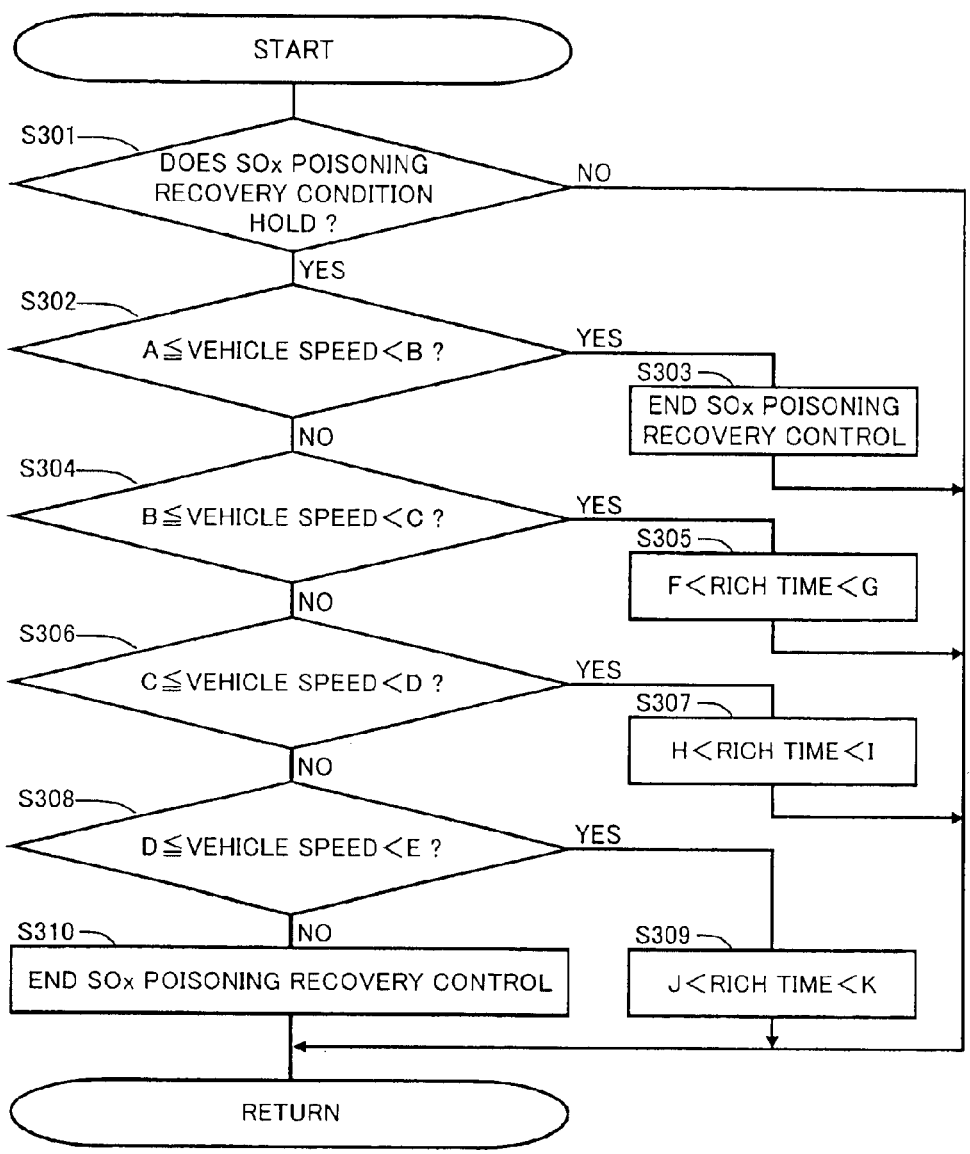
FIG. 5 is a flow chart showing the reducing agent supply time during recovery of an NOx catalyst from SOx poisoning in cases where the reducing agent supply time is further subdivided according to a vehicle speed in accordance with the second embodiment of the present invention.

FIG. 5 is a flow chart that shows a control flow for determining the reducing agent supply time during recovery of the NOx catalyst from its SOx poisoning in cases where the reducing agent supply time is further subdivided according to the vehicle speed.

In step S301, processing similar to that in step S101 in the control flow shown in FIG. 3 according to the above-mentioned first embodiment of the present invention is performed.

In step S302, it is determined whether the vehicle speed is greater than or equal to a first predetermined speed A and less than a second predetermined speed B. Here, note that a vehicle speed range greater than or equal to the first predetermined speed A and less than the second predetermined speed B is a low speed range at which there is a fear that a nasty smell due to hydrogen sulfide might be generated even if the reducing agent supply time is shortened. This vehicle speed range is determined in advance through experiments, etc., and the first predetermined speed A may be 0 km/h, for instance.

When an affirmative determination is made in step S302, the control flow proceeds to step S303, whereas when a negative determination is made in step S302, the control flow proceeds to step S304.

In step S303, the SOx poisoning recovery control is ended. Here, the SOx poisoning recovery processing is terminated as a nasty smell is generated.

In step S304, it is determined whether the vehicle speed is greater than or equal to the second predetermined speed B and less than a third predetermined speed C. Here, note that a vehicle speed range greater than or equal to the second predetermined speed B and less than the third predetermined speed C is obtained in advance by experiments or the like from the relation between the vehicle speed and the reducing agent supply time according to step S305 to be described later.

When an affirmative determination is made in step S304, the control flow proceeds to step S305, whereas when a negative determination is made in step S304, the control flow proceeds to step S306.

In step S305, the reducing agent supply time is set to a value between a fifth predetermined time F and a sixth predetermined time G. The fifth predetermined time F and the six predetermined time G are obtained in advance by experiments or the like from the relation between the reducing agent supply time and the vehicle speed in step S304.

In step S306, it is determined whether the vehicle speed is greater than or equal to the third predetermined speed C and less than a fourth predetermined speed D. Here, a vehicle speed range greater than or equal to the third predetermined speed C and less than the fourth predetermined speed D is obtained in advance by experiments or the like from the relation between the vehicle speed and the reducing agent supply time according to step S307 to be described later.

When an affirmative determination is made in step S306, the control flow proceeds to step S307, whereas when a negative determination is made in step S306, the control flow proceeds to step S308.

In step S307, the reducing agent supply time is set in a range from a seventh predetermined time H to a eighth predetermined time I. The seventh predetermined time H and the eighth predetermined time I are obtained in advance by experiments or the like from the relation between the reducing agent supply time and the vehicle speed according to step S306, and the seventh predetermined time may be equal to the sixth predetermined time G in step S305.

In step S308, it is determined whether the vehicle speed is greater than or equal to the fourth predetermined speed D and less than a fifth predetermined speed E. Here, a vehicle speed range greater than or equal to the fourth predetermined speed D and less than the fifth predetermined speed E is obtained in advance by experiments or the like from the relation between the reducing agent supply time and the overheating of the NOx catalyst according to step S309 to be described later.

When an affirmative determination is made in step S308, the control flow proceeds to step S309, whereas when a negative determination is made in step S308, the control flow proceeds to step S310.

In step S309, the reducing agent supply time is set in a range from a ninth predetermined time J to a tenth predetermined time K. The ninth predetermined time J and the tenth predetermined time K are obtained in advance by experiments or the like from the relation between the reducing agent supply time and the vehicle speed in step S308, and the ninth predetermined time J may be equal to the eighth predetermined time I in step S307.

In step S310, the SOx poisoning recovery control is ended. Here, as the vehicle speed increases, the quantity of heat supplied to the NOx catalyst 20 increases, so that the temperature of the NOx catalyst 20 is raised. As a result, when the NOx catalyst 20 is overheated, the thermal degradation of the NOx catalyst 20 is caused. Accordingly, in this second embodiment, when the vehicle speed increases to the fifth predetermined speed E or above, the SOx poisoning recovery control is ended, so that the thermal degradation of the NOx catalyst 20 is thereby suppressed. Incidentally, note that the fifth predetermined speed E, at which the thermal degradation of the NOx catalyst 20 might be generated, is obtained in advance by experiments or the like.

Here, it is to be noted that in this control flow, the ECU 35, which serves to make the amounts of reducing agent in steps S303, S305, S307 and S309 different from one another, constitutes the concentration related value derived reducing agent supply amount control section 504 (see line (5) in FIG. 7).

Thus, the generation of hydrogen sulfide can be suppressed by shortening the reducing agent supply time according to the running speed of the vehicle 100 with the engine 1 installed thereon, whereby the generation of a nasty smell due to the hydrogen sulfide can be suppressed.

In this embodiment, the relation between the vehicle speed and the reducing agent supply time may be obtained in advance by experiments or the like, so that the reducing agent supply time can be determined by using a map that is prepared based on the relation this obtained.

As described in the foregoing, according to this second embodiment, in cases where the vehicle is traveling at a speed likely to cause a nasty smell, it is possible to suppress the generation of such a nasty smell by shortening the reducing agent supply time. In addition, in the prior art, the SOx poisoning recovery processing is stopped in cases where there is a fear that a nasty smell due to hydrogen sulfide might be generated, but according to this second embodiment, the SOx poisoning can be recovered even with a small amount of reducing agent, whereby the amount of fuel consumption can be suppressed to a minimum, thus making it possible to suppress the deterioration of fuel economy.

Although in this second embodiment, the amount of reducing agent to be supplied is decreased based on the vehicle speed, the concentration of hydrogen sulfide in the atmosphere may instead be estimated based on the vehicle speed, so that the amount of reducing agent to be supplied can be decreased when the concentration of hydrogen sulfide thus estimated is higher than or equal to a predetermined value. Here, the relation between the vehicle speed and the concentration of hydrogen sulfide in the atmosphere may be determined in advance through experiments or the like, so that the concentration of hydrogen sulfide can be obtained by using a map that is prepared based on the relation thus determined. In this case, the speed sensor 37 for obtaining the vehicle speed and the ECU 35 that estimates the concentration of hydrogen sulfide in the atmosphere together constitute the hydrogen sulfide concentration estimating section 503 according to the present invention. In addition, the ECU 35, which sets the reducing agent supply time in the range in which a nasty smell due to the hydrogen sulfide in the exhaust does not pose any problem, constitutes the estimated concentration derived reducing agent supply amount control section 506 according to the present invention.

(Third Embodiment)

A third embodiment of the present invention differs from the above-mentioned first embodiment in that a determination condition or criterion for determining whether the reducing agent supply time is shortened is the concentration of sulfur in fuel, but the basic construction of the other hardware in this third embodiment is common with that of the first embodiment, and hence an explanation thereof is omitted.

Here, it is to be noted that the SOx poisoning of the NOx catalyst is generated by the sulfur composition in the fuel, and the higher the concentration of sulfur composition in the fuel, the more does the amount of sulfur oxides contained in the exhaust become, thus resulting in an increased amount of SOx poisoning. Further, the more the amount of SOx poisoning, the more does the amount of sulfur oxides discharged from the NOx catalyst during recovery thereof from the SOx poisoning become, so the amount of hydrogen sulfide in the exhaust increases accordingly. Thus, if a fuel with a high concentration of sulfur composition is refueled, the amount of hydrogen sulfide generated during recovery of the NOx catalyst from its SOx poisoning will increase, so a nasty smell will be easily generated.

Accordingly, in this third embodiment, when a fuel with a high sulfur concentration is refueled, the reducing agent supply time is shortened so as to suppress the generation of a nasty smell.

Here, for example, the amount of NOx emissions when a fuel containing sulfur of a standard concentration is refueled is obtained beforehand, so that the sulfur concentration of a fuel actually used can be determined by comparing the content of NOx in the exhaust with the amount of NOx emissions thus obtained. That is, the NOx occlusion capability of the NOx catalyst 20 is lowered by the SOx poisoning, so that nitrogen oxides flow out to downstream of the NOx catalyst 20. Thus, when a fuel with a higher sulfur concentration as compared with a fuel containing sulfur of the standard concentration is refueled, the NOx concentration of the exhaust downstream of the NOx catalyst 20 becomes high, and a determination as to whether a fuel with a higher sulfur concentration is refueled can be made by detecting the NOx concentration in the exhaust is detected by the NOx sensor 22. Here, note that the relation among the number of revolutions per minute of the engine, the engine load, and the NOx concentration in the exhaust when a fuel containing sulfur of the standard concentration is refueled is obtained in advance, and a map is prepared based on the relation thus obtained. When NOx of a concentration higher than an NOx concentration obtained by the use of this map is detected, it may be determined that a fuel with a high sulfur concentration has been refueled.

Moreover, in cases where the NOx catalyst 20 has a sufficient oxygen occlusion capability, it may be determined based on a decrease in the amount of oxygen emissions during supply of the reducing agent that a fuel with a high sulfur concentration has been refueled. In the case of the NOx catalyst 20 having a sufficient oxygen occlusion capability, the NOx catalyst 20 occludes oxygen when the oxygen concentration of the exhaust is high, and it discharges the oxygen occluded and reacts with a reducing agent when the reducing agent is supplied to the exhaust to lower the oxygen concentration thereof. As a result, even if the reducing agent is supplied to the exhaust, the air fuel ratio of the exhaust becomes constant at the stoichiometric air fuel ratio as long as the occluded oxygen is being discharged from the NOx catalyst 20. When the oxygen occluded in NOx catalyst 20 is exhausted, the exhaust is turned into a reducing atmosphere by means of the reducing agent. However, if the NOx catalyst 20 is subjected to SOx poisoning, the oxygen occluded in the NOx catalyst 20 becomes unable to react with the reducing agent, whereby the time until the air fuel ratio of the exhaust becomes the stoichiometric air fuel ratio is shortened. Accordingly, a threshold time elapsed until the air fuel ratio of the exhaust becomes the stoichiometric air fuel ratio during the time when the reducing agent is supplied when a fuel containing sulfur of the standard concentration is refueled is obtained in advance by experiments or the like. When the time until the air fuel ratio of the exhaust actually detected becomes the stoichiometric air fuel ratio is shorter than the threshold time, it can be determined that a fuel whose sulfur concentration is higher than the standard has been refueled. Here, note that the air fuel ratio of the exhaust can be detected by the provision of an air fuel ratio sensor 38 that detects the air fuel ratio of the exhaust at a location downstream of the NOx catalyst 20.

Next, reference will be made to a control flow for determining the reducing agent supply time when the NOx catalyst is recovered from its SOx poisoning according to this third embodiment.

Figure 6:
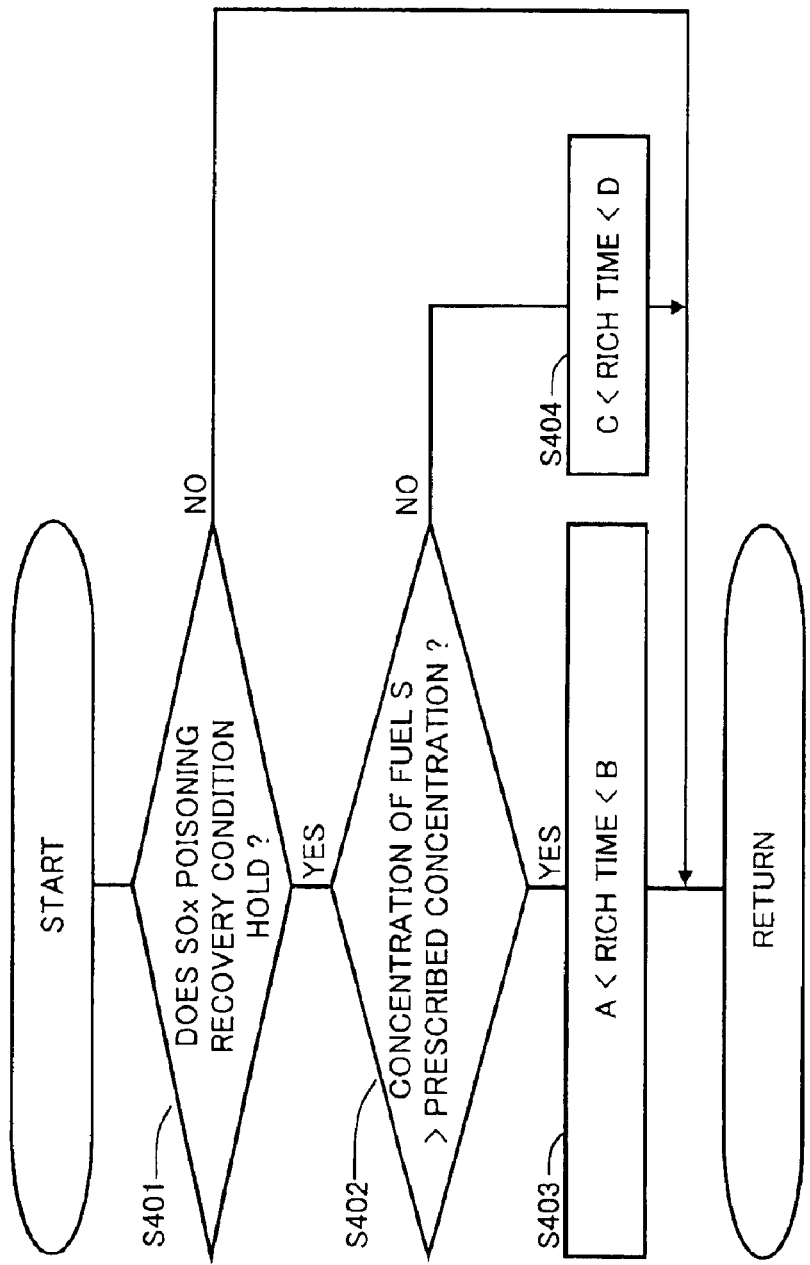
FIG. 6 is a flow chart showing a control flow for determining a reducing agent supply time during recovery of an NOx catalyst from SOx poisoning according to a third embodiment of the present invention.

FIG. 6 is a flow chart showing such a control flow. In this figure, in steps S401, S403 and S404, the processes similar to those in steps S101, S103 and S104 in the control flow shown in FIG. 3 of the first embodiment are respectively carried out.

In step S402, it is determined whether the concentration of sulfur composition in fuel is higher than a prescribed concentration. Here, the prescribed concentration is the concentration of sulfur composition of a standard fuel. In addition, the prescribed concentration may be a concentration of sulfur composition within a range in which a nasty smell due to the hydrogen sulfide in the exhaust does not pose any problem. Here, the NOx sensor 22 or the air fuel ratio sensor 38 constitutes the concentration related value detecting section 505 according to the present invention. The output signal of the NOx sensor 22 or the air fuel ratio sensor 38 is input to the ECU 35 (see line (4) in FIG. 7).

When an affirmative determination is made in step S402, the control flow proceeds to step S403, whereas when a negative determination is made in step S403, the control flow proceeds to step S404.

Thus, when a fuel of a high sulfur concentration is refueled, the generation of hydrogen sulfide can be suppressed by shortening the reducing agent supply time, whereby the generation of a nasty smell due to the hydrogen sulfide can be suppressed.

As described in the foregoing, according to this third embodiment, in cases where a fuel, which might generate a nasty smell, is refueled, it is possible to suppress the generation of such a nasty smell by shortening the reducing agent supply time. In addition, in the prior art, the SOx poisoning recovery processing is stopped in cases where there is a fear that a nasty smell due to hydrogen sulfide might be generated, but according to this third embodiment, the SOx poisoning can be recovered even with a small amount of reducing agent, whereby the amount of fuel consumption can be suppressed to a minimum, thus making it possible to suppress the deterioration of fuel economy.

Moreover, although in this third embodiment, the amount of reducing agent to be supplied is decreased when the sulfur concentration of fuel is higher than the prescribed concentration, the concentration of hydrogen sulfide in the atmosphere may instead be estimated based on the sulfur concentration of fuel, so that the amount of reducing agent to be supplied can be decreased when the concentration of hydrogen sulfide thus estimated is higher than or equal to a predetermined value. Here, the relation between the sulfur concentration of fuel and the concentration of hydrogen sulfide in the atmosphere may be determined in advance through experiments or the like, so that the concentration of hydrogen sulfide can be obtained by using a map that is prepared based on the relation thus determined. In this case, the NOx sensor 22 or the air fuel ratio sensor 38 and the ECU 35 that estimates the concentration of hydrogen sulfide in the atmosphere together constitute the hydrogen sulfide concentration estimating section 503 according to the present invention. In addition, the ECU 35, which sets the reducing agent supply time in the range in which a nasty smell due to the hydrogen sulfide in the exhaust does not pose any problem, constitutes the estimated concentration derived reducing agent supply amount control section 506 according to the present invention.

In the exhaust emission control apparatus for an internal combustion engine according to the present invention, when it is estimated that the concentration of the hydrogen sulfide discharged into the atmosphere is high, the amount of reducing agent to be supplied is decreased to reduce the amount of hydrogen sulfide generated, whereby the generation of a nasty smell can be suppressed.

While the invention has been described in terms of preferred embodiments, those skilled in the art will recognize that the invention can be practiced with modifications within the spirit and scope of the appended claims.

What is claimed is:

1. An exhaust emission control apparatus for an internal combustion engine comprising:

an NOx catalyst adapted to occlude NOx when an oxygen concentration of an exhaust is higher than or equal to a predetermined value, and reduce said NOx occluded in said NOx catalyst in the existence of a reducing agent when the oxygen concentration of the exhaust is lower than said predetermined value;

a reducing agent supplying section for supplying said reducing agent to said NOx catalyst;

an SOx poisoning recovering section for recovering said NOx catalyst from its SOx poisoning by supplying said reducing agent through said reducing agent supplying section to vary the oxygen concentration of the exhaust passing through said NOx catalyst;

a hydrogen sulfide concentration estimating section for estimating a concentration of hydrogen sulfide in an atmosphere into which said hydrogen sulfide is discharged; and an estimated concentration derived reducing agent supply amount control section for controlling an amount of reducing agent supplied from said reducing agent supplying section in such a manner that the amount of reducing agent to be supplied is decreased in accordance with the increasing concentration of hydrogen sulfide estimated by said hydrogen sulfide concentration estimating section while said NOx catalyst is recovered from the sulfur oxide poisoning.

2. The exhaust emission control apparatus for an internal combustion engine as set forth in claim 1, wherein said hydrogen sulfide concentration estimating section estimates that the smaller the amount of the exhaust discharged from said internal combustion engine, the higher the concentration of hydrogen sulfide in the atmosphere is.

3. The exhaust emission control apparatus for an internal combustion engine as set forth in claim 1, wherein said exhaust emission control apparatus is installed on a vehicle, and said hydrogen sulfide concentration estimating section estimates that the lower a moving speed of said vehicle, the higher the concentration of hydrogen sulfide in the atmosphere is.

4. The exhaust emission control apparatus for an internal combustion engine as set forth in claim 2, wherein said exhaust emission control apparatus is installed on a vehicle, and said hydrogen sulfide concentration estimating section estimates that the lower a moving speed of said vehicle, the higher the concentration of hydrogen sulfide in the atmosphere is.

5. The exhaust emission control apparatus for an internal combustion engine as set forth in claim 1, wherein said hydrogen sulfide concentration estimating section estimates that the higher a concentration of sulfur in fuel, the higher the concentration of hydrogen sulfide in the atmosphere is.

6. The exhaust emission control apparatus for an internal combustion engine as set forth in claim 2, wherein said hydrogen sulfide concentration estimating section estimates that the higher a concentration of sulfur in fuel, the higher the concentration of hydrogen sulfide in the atmosphere is.

7. The exhaust emission control apparatus for an internal combustion engine as set forth in claim 3, wherein said hydrogen sulfide concentration estimating section estimates that the higher a concentration of sulfur in fuel, the higher the concentration of hydrogen sulfide in the atmosphere is.

8. The exhaust emission control apparatus for an internal combustion engine as set forth in claim 4, wherein said hydrogen sulfide concentration estimating section estimates that the higher a concentration of sulfur in fuel, the higher the concentration of hydrogen sulfide in the atmosphere is.

9. The exhaust emission control apparatus for an internal combustion engine comprising:
- an NOx catalyst adapted to occlude NOx when an oxygen concentration of an exhaust is higher than or equal to a predetermined value, and reduce said NOx occluded in said NOx catalyst in the existence of a reducing agent when the oxygen concentration of the exhaust is lower than said predetermined value;
- a reducing agent supplying section for supplying said reducing agent to said NOx catalyst;
- an SOx poisoning recovering section for recovering said NOx catalyst from its SOx poisoning by supplying said reducing agent through said reducing agent supplying section to vary the oxygen concentration of the exhaust passing through said NOx catalyst;
- a concentration related value detecting section for detecting a value related to a concentration of hydrogen sulfide in an atmosphere into which said hydrogen sulfide is discharged while said SOx poisoning recovering section is recovering said NOx catalyst from its SOx poisoning; and
- a concentration related value derived reducing agent supply amount control section for controlling an amount of reducing agent to be supplied in such a manner that when the value detected by said concentration related value detecting section raises the concentration of hydrogen sulfide in the atmosphere higher than a predetermined concentration, the amount of reducing agent is decreased until the concentration of hydrogen sulfide in the atmosphere is decreased to or below said predetermined concentration.

10. The exhaust emission control apparatus for an internal combustion engine as set forth in claim 9, wherein said concentration related value detecting section detects an amount of intake air sucked into said internal combustion engine, and when the amount of intake air sucked into said internal combustion engine at the time of said NOx catalyst being recovered from its SOx poisoning by said SOx poisoning recovering section is smaller than an amount of intake air with which the concentration of hydrogen sulfide in the atmosphere is made lower than said predetermined concentration, said concentration related value derived reducing agent supply amount control section decreases the amount of reducing agent to be supplied until the concentration of hydrogen sulfide in the atmosphere is decreased to or below said predetermined concentration.

11. The exhaust emission control apparatus for an internal combustion engine as set forth in claim 9, wherein said exhaust emission control apparatus is installed on a vehicle, and said concentration related value detection section detects a moving speed of said vehicle, and when the moving speed of said vehicle at the time of said NOx catalyst being recovered from its SOx poisoning by said SOx poisoning recovering section is lower than a moving speed of said vehicle at which the concentration of hydrogen sulfide in the atmosphere is made lower than said predetermined concentration, said concentration related value derived reducing agent supply amount control section decreases the amount of reducing agent to be supplied until the concentration of hydrogen sulfide in the atmosphere is decreased to or below said predetermined concentration.

12. The exhaust emission control apparatus for an internal combustion engine as set forth in claim 9, wherein said concentration related value detection section detects a concentration of sulfur in fuel, and when said concentration of sulfur in the fuel is higher than a sulfur concentration at which the concentration of hydrogen sulfide in the atmosphere is made lower than said predetermined concentration, said concentration related value derived reducing agent supply amount control section decreases an amount of fuel to be supplied by a predetermined amount at the time of said NOx catalyst being recovered from its SOx poisoning.

13. An exhaust emission control method for an internal combustion engine comprising:
- a first step of detecting a value related to a concentration of hydrogen sulfide in an atmosphere into which said hydrogen sulfide is discharged when a reducing agent is supplied so as to recover said NOx catalyst from its SOx poisoning; and
- a second step for controlling an amount of reducing agent to be supplied in such a manner that when the value detected in said first step raises the concentration of hydrogen sulfide in the atmosphere higher than a predetermined concentration, the amount of reducing agent to be supplied is decreased by a predetermined amount so as to lower the concentration of hydrogen sulfide in the atmosphere to or below said predetermined concentration.

14. The exhaust emission control method for an internal combustion engine as set forth in claim 13, wherein in said first step, an amount of intake air sucked into said internal combustion engine is detected as the value related to the concentration of hydrogen sulfide in the atmosphere into which said hydrogen sulfide is discharged, and in said second step, when the amount of intake air sucked into said internal combustion engine is smaller than a prescribed amount, the amount of reducing agent to be supplied is decreased by said predetermined amount so as to lower the concentration of hydrogen sulfide in the atmosphere to said predetermined concentration.

15. The exhaust emission control method for an internal combustion engine as set forth in claim 13, wherein in said first step, a moving speed of a vehicle is detected as the value related to the concentration of hydrogen sulfide in the atmosphere into which said hydrogen sulfide is discharged, and in said second step, when the moving speed of a vehicle is smaller than a prescribed speed, the amount of reducing agent to be supplied is decreased by said predetermined amount so as to lower the concentration of hydrogen sulfide in the atmosphere to or below said predetermined concentration.

16. The exhaust emission control method for an internal combustion engine as set forth in claim 13, wherein in said first step, a concentration of sulfur in fuel is detected as the value related to the concentration of hydrogen sulfide in the atmosphere into which said hydrogen sulfide is discharged, and in said second step, when the concentration of sulfur in the fuel is higher than a prescribed concentration, the amount of reducing agent to be supplied is decreased by said predetermined amount so as to lower the concentration of hydrogen sulfide in the atmosphere to or below said predetermined concentration.

* * * * *

UNITED STATES PATENT AND TRADEMARK OFFICE
CERTIFICATE OF CORRECTION

PATENT NO.    : 6,922,988 B2
DATED         : August 2, 2005
INVENTOR(S)   : Masaaki Yamaguchi et al.

It is certified that error appears in the above-identified patent and that said Letters Patent is hereby corrected as shown below:

Title page,
Item [73], Assignee, should read -- Toyota Jidosha Kabushiki Kaisha, Toyota (JP) --.

Signed and Sealed this

Twenty-fourth Day of January, 2006

JON W. DUDAS
*Director of the United States Patent and Trademark Office*